United States Patent
Nakamura

(10) Patent No.: US 10,245,898 B2
(45) Date of Patent: Apr. 2, 2019

(54) RUBBER DECOR AND TIRE

(71) Applicant: BRIDGESTONE CORPORATION, Chuo-ku, Tokyo (JP)

(72) Inventor: Yuki Nakamura, Nerima-ku (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1003 days.

(21) Appl. No.: 14/365,364

(22) PCT Filed: Nov. 26, 2012

(86) PCT No.: PCT/JP2012/007561
§ 371 (c)(1),
(2) Date: Jun. 13, 2014

(87) PCT Pub. No.: WO2013/099103
PCT Pub. Date: Jul. 4, 2013

(65) Prior Publication Data
US 2014/0338809 A1    Nov. 20, 2014

(30) Foreign Application Priority Data
Dec. 27, 2011    (JP) ................ 2011-286415

(51) Int. Cl.
*B60C 13/00*    (2006.01)
*B60C 13/04*    (2006.01)

(52) U.S. Cl.
CPC ............ *B60C 13/001* (2013.01); *B60C 13/04* (2013.01); *Y10T 428/24628* (2015.01); *Y10T 428/24802* (2015.01)

(58) Field of Classification Search
CPC .. B60C 13/001; B60C 13/04; B60C 2013/045
See application file for complete search history.

(56) References Cited

U.S. PATENT DOCUMENTS

| | | | | |
|---|---|---|---|---|
| 1,448,286 A | * | 3/1923 | Comstock | B29D 30/72 152/523 |
| 2,800,874 A | * | 7/1957 | Leslie | B44D 3/225 118/301 |
| 5,300,164 A | * | 4/1994 | DeTrano | B29D 30/72 152/524 |
| 6,001,459 A | | 12/1999 | Mahn, Jr. | |

(Continued)

FOREIGN PATENT DOCUMENTS

JP    63205291 A    8/1988
JP    05-338032 A    12/1993
(Continued)

OTHER PUBLICATIONS

Machine Translation: JP 2003118297 A; Kanari, Daisuke; no date.*
(Continued)

*Primary Examiner* — Kendra Ly
(74) *Attorney, Agent, or Firm* — Sughrue Mion, PLLC

(57) ABSTRACT

There is provided a rubber decor or a tire having: a rubber; a white layer arranged on or above a surface of the rubber and composed of a white paint; and a colored layer composed of a paint except a white paint and at least partially applied on the white layer. The darkest part of the white layer has brightness of 80% or more. The white layer and the colored layer constitute a desired decoration.

15 Claims, 4 Drawing Sheets

(56) References Cited

U.S. PATENT DOCUMENTS

| | | | |
|---|---|---|---|
| 6,093,271 A * | 7/2000 | Majumdar | B60C 13/001 152/524 |
| 2004/0020575 A1 | 2/2004 | Zanzig et al. | |
| 2006/0016534 A1 * | 1/2006 | Peyron | B60C 13/001 152/152.1 |
| 2010/0116401 A1 * | 5/2010 | Yoshikawa | B60C 13/04 152/524 |

FOREIGN PATENT DOCUMENTS

| | | | | |
|---|---|---|---|---|
| JP | 10-222070 | A | | 8/1998 |
| JP | 2002-301904 | A | | 10/2002 |
| JP | 2003-118297 | A | | 4/2003 |
| JP | 2003118297 | A | * | 4/2003 |
| JP | 2007-210378 | A | | 8/2007 |
| JP | 2010-281606 | A | | 12/2010 |
| KR | 1020000048882 | A | * | 7/2000 |
| KR | 20050037821 | A | * | 4/2005 |
| KR | 1020100036767 | A | * | 4/2010 |
| WO | 2012/035690 | A1 | | 3/2012 |

OTHER PUBLICATIONS

Machine Translation: KR1020100036767A; Lee C; Park J ; Park S ; Yang D; no date.*
Machine Translation:KR1020000048882A; Lell C; Mickat F ; Rapp E ; Sallei; no date.*
Machine Translation: KR-20050037821-A; Pakr Jin Hee; (Year: 2018).*
International Search Report, PCT/JP2012/007561, dated Feb. 26, 2013.
Communication dated Sep. 1, 2015 from the Japanese Patent Office in counterpart application No. 2011-286415.
Communication dated Oct. 13, 2015 from the Japanese Patent Office in counterpart application No. 2011-286415.
Communication dated Oct. 30, 2015, issued by the State Intellectual Property Office of the P.R.C. in corresponding Chinese Application No. 201280062935.1.
Communication dated Aug. 3, 2015, issued by the European Patent Office in corresponding European Application No. 12863774.1.

* cited by examiner

RUBBER DECOR AND TIRE

CROSS REFERENCE TO RELATED APPLICATIONS

This application is a National Stage of International Application No. PCT/JP2012/007561 filed Nov. 26, 2012, claiming priority based on Japanese Patent Application No. 2011-286415 filed Dec. 27, 2011, the contents of all of which are incorporated herein by reference in their entirety.

TECHNICAL FIELD

The present invention relates a rubber decor and a tire in which a decoration is provided on a surface of rubber which is likely to affect a colored layer and to alter coloring of the colored layer. In particular, the present invention proposes a technique for providing a decoration with enhanced coloring of the colored layer.

RELATED ART

In order to improve a decorative property of rubber used for a tire or the like, it has been demanding that a colored layer is provided on a surface of the rubber to distinguish the decoration.

However, black rubber or the like which contains carbon and is used for a tire has a problem that, when a decoration having the colored layer is provided directly on the surface of the rubber, ground black color of the rubber or the like with low brightness affects the colored layer to alter coloring of the colored layer. As a result, color of the decoration becomes dull and the decoration itself becomes less-visible.

SUMMARY OF INVENTION

Technical Problem

The present invention aims to solve the problems that the conventional techniques have, and an object of the present invention is to provide a rubber decor and a tire having a decoration with improved coloring without being affected by ground color of the rubber.

Solution to Problem

A rubber decor according to the present invention has: a rubber; a white layer arranged on or above a surface of the rubber and composed of a white paint; and a colored layer composed of a paint except a white paint and at least partially applied on the white layer, wherein the darkest part of the white layer has brightness of 80% or more, and the white layer and the colored layer constitute a desired decoration.

In addition, a tire according to the present invention has: a tread portion contacting a road surface; and a sidewall portion continuing into the tread portion, in which sidewall rubber constituting the sidewall portion includes the above-mentioned rubber decor.

In the present invention, a decoration refers a character, graphics, a symbol including a bar code, a pattern or the like.

In addition, in the present invention, brightness, saturation and hue are defined in the HSV model. The brightness is calculated by using a spectral colorimeter (for example, FD-5 available from Konica Minolta) to measure brightness, saturation and hue of measurement targets in different system (for example, a Lab color space) and then using necessary software (for example, photoshop (registered trademark)) to convert the brightness, saturation and hue to those in the HSV system.

In the specification and claims, dimensions such as a tilt of a boundary between rubber layers in a cross-section in the tire width direction are measured with the tire being mounted on an applicable rim, and with predetermined internal pressure being applied to the tire and no load being applied to the tire.

In addition, the term "tire cross sectional height" represents a half of difference between the outer diameter of the tire and a diameter of the applicable rim.

In this disclosure, the term "applicable rim" represents a rim prescribed by valid industrial standards for the region in which the tire is produced or used, such as the "JATMA (Japan Automobile Tyre Manufacturers Association) Year Book" in Japan, the "ETRTO (European Tyre and Rim Technical Organisation) Standard Manual" in Europe, and the "TRA (Tire and Rim Association, Inc.) Year Book" in the United States of America.

The term "predetermined internal pressure" represents an applied air pressure (maximum air pressure) corresponding to the maximum load capability of the tire as specified in accordance with tire size under the standards of JATMA or the like, and the term "maximum load capability" represents the maximum mass permitted as a load on the tire under the above standards.

Furthermore, the term "tire maximum width" represents a maximum width of a tire mounted on an applicable rim in an application tire size prescribed in the JATMA (Japan Automobile Tyre Manufacturers Association) Year Book, and with predetermined internal pressure being applied.

Advantageous Effect of Invention

The rubber decor according to the present invention has: a rubber; a white layer arranged on or above a surface of the rubber and composed of a white paint; and a colored layer composed of a paint except a white paint and at least partially applied on the white layer, wherein the darkest part of the white layer has brightness of 80% or more and the white layer and the colored layer constitute a desired decoration. As a result, the white layer can cover and mask the ground color of the rubber to prevent the ground color of the rubber from affecting the colored layer provided on the white layer and composed of a paint except a white paint. Accordingly, a decoration with good coloring can be provided on the rubber.

In addition, in the tire according to the present invention, sidewall rubber of the sidewall portion, which tends to attract viewer's attention when the tire is mounted on a vehicle, is formed of the rubber decor with good coloring, so that the decorative property of the tire can be improved.

DESCRIPTION OF EMBODIMENTS

With reference to the drawings, an embodiment of the present invention is discussed below.

It is noted that the following description is by way of example only, and features, operations and effects of members are not limited to the description.

Figure 1:
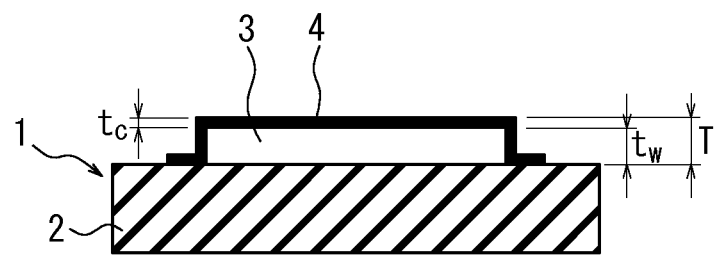
FIG. 1 is a side cross-sectional view of a rubber decor in an embodiment of the present invention.

FIG. 1 illustrates a rubber decor 1 having a rubber 2, a white layer 3 arranged on or above a surface of the rubber 2 and a colored layer 4 painted on the white layer 3. The rubber 2 has a ground color such as black and may alter coloring of the colored layer. The white layer 3 is composed of a white paint and has the darkest part with brightness of 80% or more. The colored layer 4 is composed of a paint except a white paint.

The white layer 3 consists of a white paint with the darkest part having brightness of 80% or more, so that the colored layer 4 is not affected by the ground color of the rubber 2. As a result, a decoration with good coloring can be provided on the rubber.

From a viewpoint of improving productivity of a tire, an ultraviolet ink is preferably used for the white layer and the colored layer in order to eliminate drying time of the ink after the ink is applied. The ultraviolet ink is composed mainly of a photopolymerization initiator, an oligomer, a monomer and colorant, and optionally includes an ultraviolet absorbing agent, an antioxidant, a light stabilizer, an adhesion promoter, a rheology control agent or a dispersant.

Figure 2:
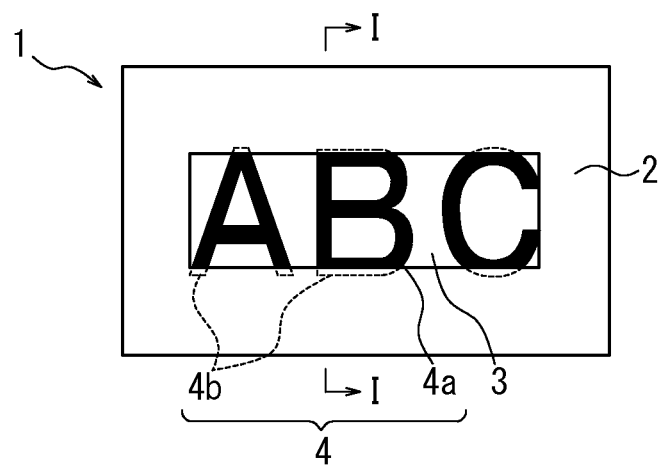
FIG. 2 is a plan view of the rubber decor illustrated in FIG. 1.

The appearance of the rubber decor is illustrated in FIG. 2. The rectangular white layer 3 is provided on or above the surface of the rubber 2. The colored layer 4 is provided on the white layer 3 by, for example, applying a yellow paint. The white layer 3 and the colored layer 4 form characters "ABC", which is an example of a decoration. Ends of the colored layer 4 in the vertical direction in FIG. 2 protrude from a surface of the white layer 3 and are arranged on or above the surface of the rubber 2. A portion of the colored layer 4 overlapping with the white layer 3 is referred to as a colored portion 4a, and another portion of the colored layer 4 protruding from the white layer 3 is referred to as a blurred portion 4b.

The colored layer 4 may have any color except white. The ground color of the rubber may be exposed in order to form a black decoration or the like.

When the colored layer is applied directly on the surface of the rubber 2, the color of the colored layer appears to be merged with the ground color of the rubber 2, and coloring of the colored layer may be altered. As a result, the colored layer may be less conspicuous.

In the present invention, the white layer 3 covers the ground color of the rubber 2, and thus the colored layer 4 provided on the white layer 3 is less likely to be affected by the ground color of the rubber 2. As a result, coloring of the colored layer is improved, and a decoration with good coloring can be provided on the rubber. The white layer 3 is preferably pure white. In other words, brightness of the white layer 3 is preferably 100%. This configuration may allow the ground color of the rubber 2 to be completely covered with the white layer 3 to further improve the coloring of the colored layer 4.

In the colored portion 4a of the colored layer 4, the colored layer 4 covers the ground color of the rubber 2, and thus the colored portion 4a is less likely to be affected by the ground color of the rubber 2 to improve the coloring of the colored portion 4a. As a result, viewers may visually recognize a vivid yellow decoration. Meanwhile, in the blurred portion 4b, the color of the colored layer appears to be merged with the ground color of the rubber 2, and coloring of the blurred portion 4b is altered and the blurred portion 4b appears dull. As a result, the blurred portion 4b is less conspicuous for the viewers.

Accordingly, in the case that unevenness, patchiness or the like occurs at an end of the colored portion 4a due to print inaccuracy, the unevenness, patchiness or the like may be a part of the blurred portion 4b to be less noticeable. In addition, an outline of the colored portion 4a may be made to look distinguished.

Figure 3:
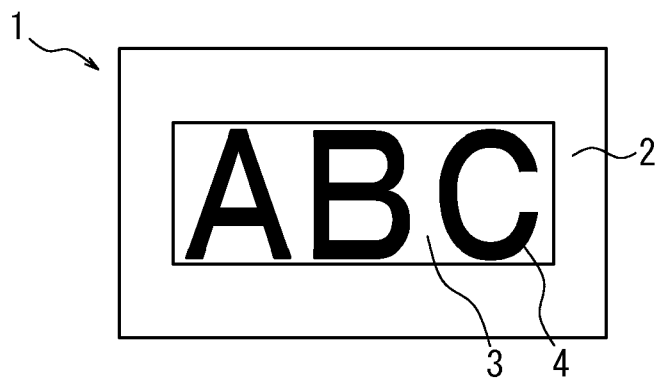
FIG. 3 is a plan view of a rubber decor in another embodiment of the present invention.

Meanwhile, as illustrated in FIG. 3, the white layer 3 may protrude from the colored layer 4 and be arranged on or above the surface of the rubber 2. In this case the colored layer 4 may not appear to be merged with the ground color of the rubber 2 in its entirety, and thus the decorative property may be sufficiently improved. In addition, the decoration of the colored layer 4 may contrast with the white layer 3 and thus visibility of the decoration may be improved.

When thickness of the colored layer 4 is between, for example, 20 μm and 40 μm, and thickness tw of the thickest part of the white layer 3 is equal or greater than thickness tc of the thickest part of the colored layer 4, influence of the ground color of the rubber 2 to the colored layer 4 may be smaller to improve the coloring of the colored layer 4.

The ratio tw/tc of the thickness tw of the thickest part of the white layer 3 to the thickness tc of the thickest part of the colored layer 4 is preferably not less than 1 and not more than 4, and more preferably not less than 1 and not more than 2. When the ratio tw/tc is less than 1, the white layer may be too thin to sufficiently cover the ground color of the rubber, and thus the coloring of the colored layer may not be sufficiently improved. When the ratio tw/tc is more than 4, the difference of deformations between the white layer and the colored layer may be large to generate a crack between the white layer and the colored layer when the rubber is bent or strained.

The rubber decor according to the present invention may be used for a tire or the like which largely bends or largely strains since a crack may be effectively prevented when the rubber is bent or strained.

In addition, when total thickness T of the white layer 3 and the colored layer 4 is 250 μm or less, the difference of the deformations between the rubber 2 and the white and colored layers 3, 4 may be minimized as much as possible to effectively prevent a crack between the rubber 2 and the white and colored layers 3, 4 when the rubber 2 bends or deforms.

When the total thickness T is not uniform, the maximum value of the total thickness T is preferably 250 μm or less.

When the thickness tw of the white layer 3 is larger, the ground color of the rubber 2 may be more hidden to further improve the coloring of the colored layer 4. The thickness tw is preferably 50 μm or more.

Meanwhile, when the thickness tc of the colored layer 4 is larger, the colored layer 4 may appear more colorful. The thickness tc is preferably between 20 μm and 40 μm. When the thickness tc of the colored layer 4 is thin, the colored layer 4 may appear blurred.

When the white layer 3 is pure white, the white layer 3 may completely hide the ground color of the rubber 2 to further improve the coloring of the colored layer 4.

Figure 4:
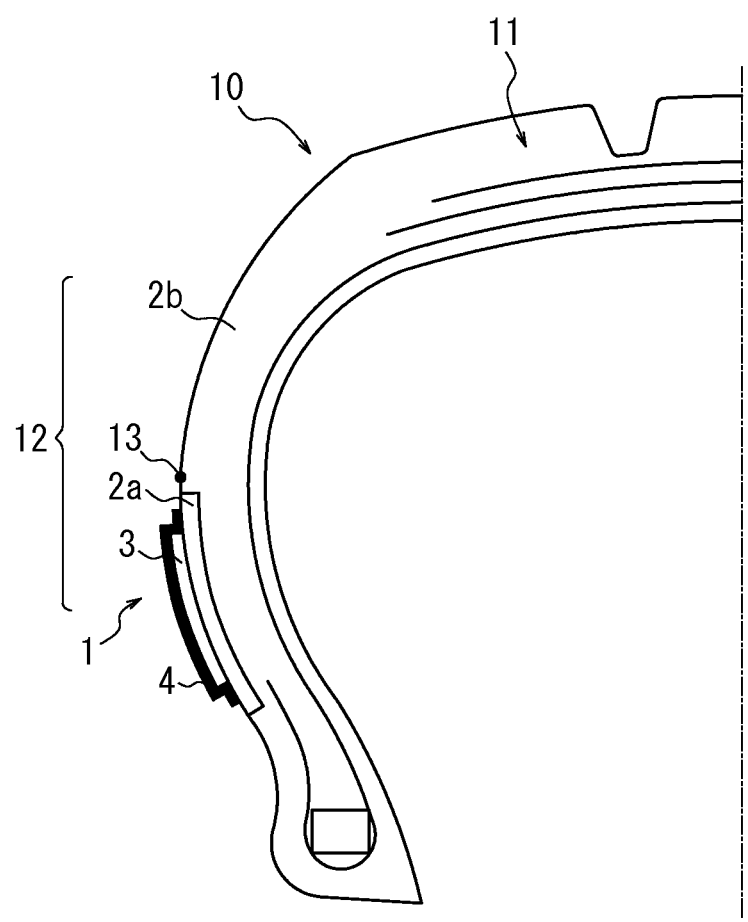
FIG. 4 is a cross-sectional view of a tire in an embodiment of the present invention in a tire width direction.

A tire illustrated in FIG. 4 has a tread portion 11 contacting a road surface and a sidewall portion 12 continuing into the tread portion 11. In the tire, the above rubber decor 1 is provided on a surface of the sidewall portion 12.

This configuration allows to form a colorful decoration in the sidewall portion 12 which is likely to attract viewer's attention when the tire 10 is attached to a vehicle to improve a decorative property.

A rubber used for the sidewall portion 12 typically includes an age resistor in order to prevent the rubber from being deteriorated by ozone or heat when the tire is used and to improve weather resistance.

However, when rubber including the age resistor is arranged around the white layer 3 and the colored layer 4, the age resistor has a problem of gradually polluting the white layer 3 and the colored layer 4.

Figure 5:
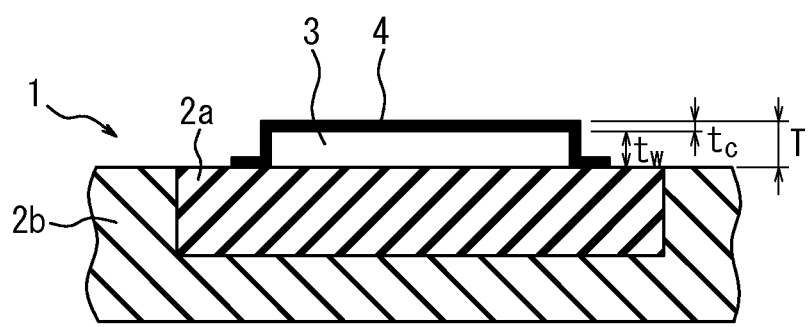
FIG. 5 is a partial enlarged cross-sectional view of a surface of a sidewall portion of the tire illustrated in FIG. 4.

As illustrated in FIGS. 4 and 5, a barrier layer, i.e. a rubber layer 2a including butyl-based rubber may be provided on a surface of the rubber 2 and at least an area adjacent to the white layer 3, and a rubber layer 2b including the age resistor may be provided around the barrier layer 2a. The butyl-based rubber represents butyl rubber, halogenated butyl rubber and the like.

In the barrier layer 2a including butyl-based rubber (butyl rubber in this embodiment), permeability to an age resistor is low so that the barrier layer 2a may block the age resistor oozed from the adjacent rubber layer 2b to prevent the white layer 3 and the colored layer 4 from being gradually polluted by the age resister. In addition, the rubber layer 2b including the age register may prevent the rubber in the sidewall portion 12 from being deteriorated. The butyl-based rubber blocks the age resistor oozed from the adjacent rubber layer 2b to prevent the age resistor from rising to a outer surface of the barrier layer 2a. As a result, adhesive property of the white layer 3 to rubber may be improved, and thus primer treatment may be eliminated during providing the white layer 3 to improve productivity.

The barrier layer preferably includes butyl-based rubber by 80 wt. part or more in the rubber of 100 wt. part in order to effectively block an age resistor oozed from the adjacent rubber. When the butyl-based rubber is included by less than 80 wt. part, the rising of the age resister from the rubber adjacent to the rubber barrier layer may not be effectively prevented. As a result, the adhesive property of the white layer to the rubber may be degraded, and stain resistance of the white layer and the colored layer may be degraded.

When the barrier layer 2a includes a clay mineral, the age resistor permeation from the rubber layer 2b may be more decreased to further improve the effect of preventing pollution by the barrier layer 2a.

Figure 6:
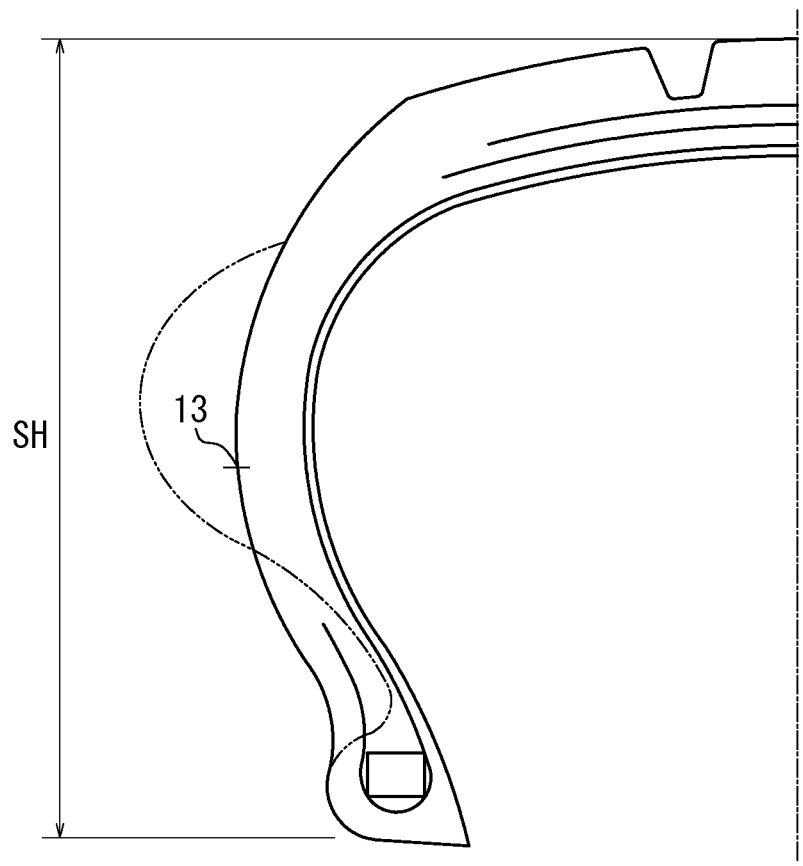
FIG. 6 is a cross-sectional view of a tire in the tire width direction, exaggeratingly illustrating the way that the outer surface of the side portion deforms when the tire is rotated with load being applied thereon.

FIG. 6 exaggeratingly illustrates deformation of a side portion of a tire by a virtual line when the tire is rotated with load being applied thereon. As illustrated in FIG. 6, when the tire is rotated with load being applied thereon, the amount of deformation of the tire reaches a peak near a tire maximum width position 13, and the amount of deformation decreases inward from the tire maximum width position 13 in the tire radial direction.

When tire radial outer ends of the white layer 3 and the colored layer 4 are arranged on the inner side of the tire radial direction from the tire maximum width position 13, the white layer and the colored layer are arranged at an area where the tire deformation amount is small while the tire is rotated with load being applied thereon. As a result, peeling may be more effectively prevented.

The above rubber decor may be used as rubber of a rubber crawler, a conveyor belt or the like to improve decorativeness.

EXAMPLES

Coloring Evaluation Test

As described below, coloring recognized by a viewer was surveyed for produced Example Tires according to the present invention and produced Comparative Tires, the size of the tires being 195/65R15. Specifically, 30 viewers observed the produced rubber decors and answered a questionnaire according to five levels regarding the coloring of the tire decors. Table 1 shows the results. With the surveillance results of the coloring for the comparative rubber decor as 100, the investigation results for each rubber decor are indicated as an index. A greater value indicates that the viewers felt better coloring.

As illustrated in FIGS. 2, 4 and 5, in Example Tires, a white layer was formed on or above a surface of a sidewall portion, and a colored layer was applied on the white layer. The white layer was composed of an ultraviolet curing ink (produced by MIMAKI ENGINEERING CO., LTD.) Meanwhile, in Comparative Tires, only a colored layer composed of an ultraviolet curing ink (produced by MIMAKI ENGINEERING CO., LTD.) was provided on a surface of a sidewall portion.

Table 1 shows colors and thicknesses tw, tc of the thickest parts of the white layer and the colored layer, respectively, in Example Tires and Comparative Tires. It is noted that combination of brightness, saturation and hue is referred to as color. The brightness, the saturation and the hue are defined in the HSV model.

In Example Tires 1-9 and 11, and Comparative Tires 1 and 2, sidewall rubber included a barrier layer five millimeters on and around the white layer. In the barrier layer, butyl rubber was included in 90 wt. part. The barrier layer did not include an age resistor.

The distance between radial outer end of the colored layer and a bead toe is divided by a tire cross sectional height SH, and then is multiplied by 100, and the result is the value (the percentage) $r_o$. Table 1 shows the value $r_o$ in Example Tires and Comparative Tires. In both Example Tires and Comparative Tires, the value $r_o$ was 50 at the tire maximum width position.

Stain Resistance Evaluation Test

The above Example Tires and Comparative Tires were produced and left in an outdoor location for 24 hours. Then, whether colored rubber layer discolored or not was tested to evaluate stain resistance. Table 1 shows the result. "Good" indicates that the colored rubber layer did not discolor and indicates good stain resistance. "No Good" indicates that the colored rubber layer somewhat discolored.

Crack Resistance Evaluation Test

The Example Tires and Comparative Tires were mounted to a size 6JJ (prescribed in JATMA) rim, and were inflated to an air pressure of 240 kPa (maximum air pressure prescribed in JATMA). Then, the tires ran for 10,000 kilometers at 60 km/hour on a drum under a load of 615 kilogram-weight (maximum load prescribed in JATMA). Whether crack existed between the sidewall rubber and the white layer or between the white layer and the colored layer was investigated and total length of the crack in the circumferential direction was measured when crack existed to evaluate crack resistance. FIG. 1 shows the result.

Regarding evaluation result in Table 1, "Excellent" indicates that the total projected length of the crack in the circumferential direction was less than 5 millimeters. "Good" indicates that the total projected length of the crack in the circumferential direction was 5 millimeters or more and 20 millimeters or less. "No good" indicates that the total projected length of the crack in the circumferential direction was more than 20 millimeters.

3: White layer
4: Colored layer
   4a: Colored portion
   4b: Blurred portion
10: Tire
11: Tread portion
12: Sidewall portion
13: Tire maximum width position

TABLE 1

|  |  | Example Tire 1 | Example Tire 2 | Example Tire 3 | Example Tire 4 | Example Tire 5 | Example Tire 6 | Example Tire 7 | Example Tire 8 | Example Tire 9 | Example Tire 10 |
|---|---|---|---|---|---|---|---|---|---|---|---|
| Barrier layer |  | Exist | | | | | | | | | Not exist |
| White layer | Color | White (brightness 80%, saturation 0%, hue 0 degrees) | | | | | | | | | |
|  | Thickness tw(μm) | 50 | 40 | 12.5 | 200 | 100 | 240 | 45 | 50 | 50 | 50 |
| Colored layer | Color | Blue (brightness 50%, saturation 100%, hue 250 degrees) | | | | | | | | | |
|  | Thickness tc(μm) | 50 | 50 | 50 | 50 | 50 | 60 | 10 | 50 | 50 | 50 |
|  | Position of outer end $r_o$(%) | 40 | 40 | 40 | 40 | 40 | 40 | 40 | 50 | 60 | 40 |
| tw/tc |  | 1.0 | 0.8 | 0.25 | 4.0 | 2.0 | 4.0 | 4.5 | 1.0 | 1.0 | 1.0 |
| T(μm) |  | 100 | 90 | 62.5 | 250 | 150 | 300 | 55 | 100 | 100 | 100 |
| Coloring |  | 125 | 120 | 110 | 140 | 130 | 140 | 140 | 125 | 125 | 125 |
| Crack resistance |  | Excellent | Excellent | Excellent | Good | Excellent | Good | No good | Good | No good | Good |
| Stain resistance |  | Good | Good | Good | Good | Good | Good | Good | Good | Good | No good |

|  |  | Example Tire 11 | Comparative Tire 1 | Comparative Tire 2 |
|---|---|---|---|---|
| Barrier layer |  | Exist | | |
| White layer | Color | Pure white (brightness 100%, saturation 0%, hue 0 degrees) | — | White (brightness 70%, saturation 0%, hue 0 degrees) |
|  | Thickness tw(μm) | 50 | — | 50 |
| Colored layer | Color | Blue (brightness 50%, saturation 100 hue 250 degrees) | | |
|  | Thickness tc(μm) | 50 | 50 | 50 |
|  | Position of outer end $r_o$(%) | 40 | 40 | 40 |
| tw/tc |  | 1.0 | — | 1.0 |
| T(μm) |  | 100 | — | 100 |
| Coloring |  | 150 | 100 | 110 |
| Crack resistance |  | Good | Good | Good |
| Stain resistance |  | Good | Good | Good |

The examination result shows that for example rubber decors provided with a rubber, a white layer provided on or above a surface of the rubber and a colored layer applied on the white layer, coloring was improved with respect to comparative rubber decors.

The examination result also shows that crack resistance may be improved when the ratio tw/tc of the thickness tw of the thickest part of the white layer to the thickness tc of the thickest part of the colored layer is not less than 1 and not more than 4, when total thickness T of the thickest part of the white layer and the colored layer is 250 μm or less and/or when tire radial outer ends of the white layer and the colored layer is arranged on an inner side of the tire radial direction than a tire maximum width position.

In addition, it is shown that stain resistance may be improved when a barrier layer including butyl-based rubber is provided in an area on a surface of rubber and adjacent to the white layer.

REFERENCE SIGNS LIST

1: Rubber decor
2: Rubber
   2a: Rubber layer including butyl-based rubber (Barrier layer)
   2b: Rubber layer including an age resistor
SH: Tire cross sectional height
tw: Thickness of the thickest part of white layer
tc: Thickness of the thickest part of colored layer
T: Total thickness of the thickest part of white layer and colored layer

The invention claimed is:

1. A tire comprising:
a tread portion contacting a road surface; and
a sidewall portion continuing into the tread portion,
wherein sidewall rubber constituting the sidewall portion includes a rubber decor comprising:
a rubber;
a white layer arranged on or above a surface of the rubber and composed of a white paint; and
a colored layer composed of a paint except a white paint and at least partially applied on the white layer,
wherein the darkest part of the white layer has brightness of 80% or more, and the white layer and the colored layer constitute a desired decoration,
wherein the white paint is an ultraviolet ink and the paint except a white paint is an ultraviolet ink,
wherein the rubber comprises a barrier layer at the surface of the rubber and at least at an area adjacent to the white layer, the barrier layer including butyl-based rubber, wherein an outermost end in a tire radial direction of the barrier layer is arranged on an inner side of a tire maximum width position in the tire radial direction, and wherein tire radial outer ends of the white layer and the colored layer are arranged on the inner side of the tire maximum width position in the tire radial direction.

2. The tire according to claim 1, wherein thickness (tw) of the thickest part of the white layer is equal or greater than thickness (tc) of the thickest part of the colored layer.

3. The tire according to claim 2, wherein the ratio (tw/tc) of thickness (tw) of the thickest part of the white layer to the thickness (tc) of the thickest part of the colored layer is not less than 1 and not more than 4.

4. The tire according to claim 3, wherein the ratio (tw/tc) of the thickness (tw) of the thickest part of the white layer to the thickness (tc) of the thickest part of the colored layer is not less than 1 and not more than 2.

5. The tire according to claim 1, wherein the white layer is pure white.

6. The tire according to claim 1, wherein total thickness (T) of the thickest part of the white layer and the colored layer is 250 µm or less.

7. The tire according to claim 1, wherein at least a part of the colored layer protrudes from the white layer and is arranged on or above the surface of the rubber.

8. The tire according to claim 1, wherein at least a part of the white layer protrudes from the colored layer and is arranged on or above the surface of the rubber.

9. The tire according to claim 1, wherein the colored layer is directly on the white layer.

10. The tire according to claim 1, wherein the white layer has a brightness of 100%.

11. The tire according to claim 1, wherein the thickness of the colored layer is from 20 µm to 40 µm.

12. The tire according to claim 11, wherein the thickness of the white layer is 50 µm or more.

13. The tire according to claim 11, wherein the thickness of the white layer is 100 µm or more.

14. The tire according to claim 1, wherein the thickness of the white layer is 50 µm or more.

15. The tire according to claim 1, wherein the barrier layer includes 80 parts by weight or more of the butyl-based rubber per 100 parts by weight of rubber in the barrier layer.

* * * * *